R. PRANTNER.
POWER TRANSMISSION DEVICE.
APPLICATION FILED MAR. 8, 1920.
1,353,936. Patented Sept. 28, 1920.
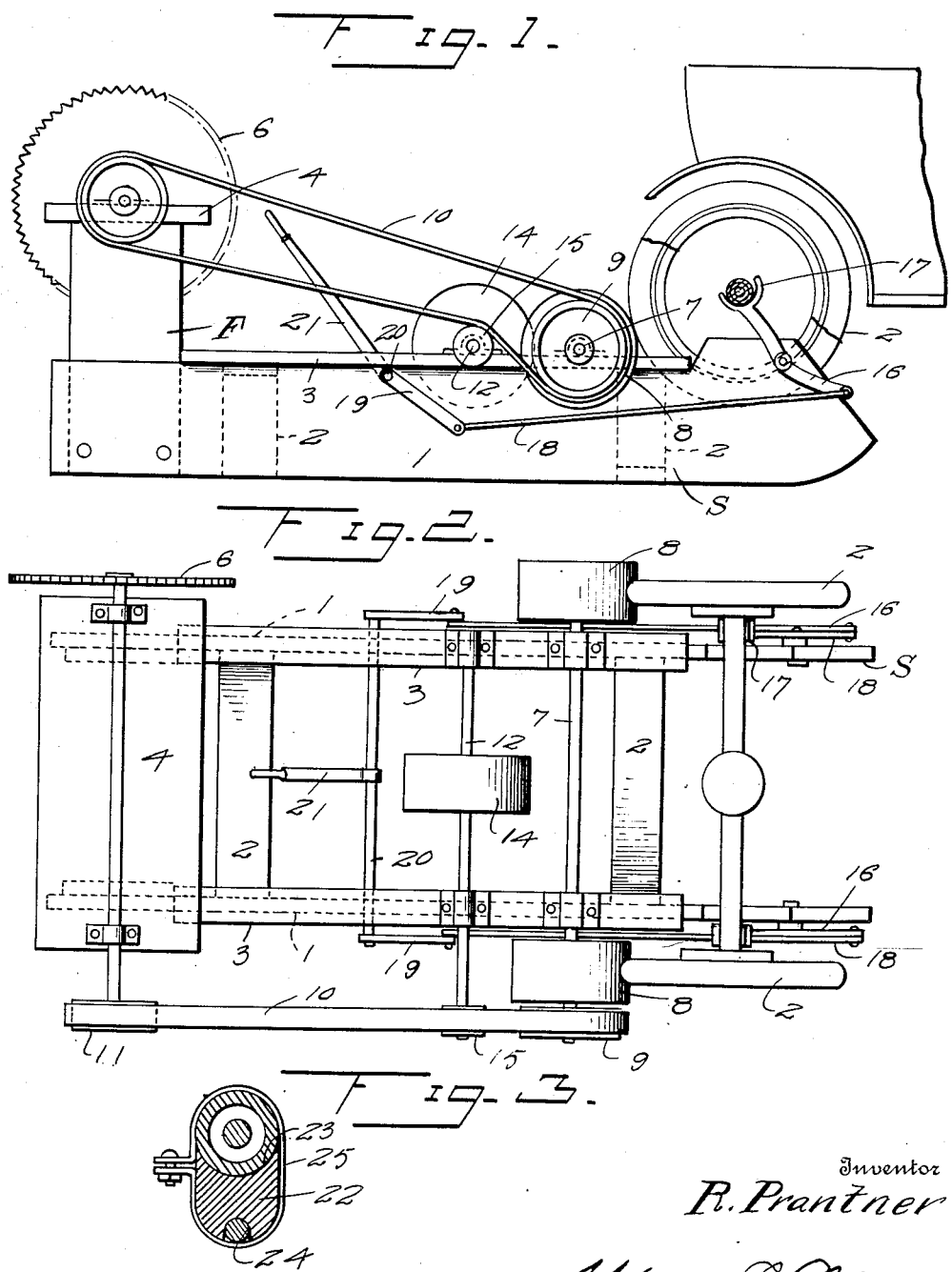

UNITED STATES PATENT OFFICE.

RUDOLF PRANTNER, OF WRIGHT, MINNESOTA.

POWER-TRANSMISSION DEVICE.

1,353,936.                Specification of Letters Patent.        Patented Sept. 28, 1920.

Application filed March 8, 1920. Serial No. 363,954.

*To all whom it may concern:*

Be it known that I, RUDOLF PRANTNER, a citizen of the United States, residing at Wright, in the county of Carlton and State of Minnesota, have invented certain new and useful Improvements in Power-Transmission Devices, of which the following is a specification, reference being had to the accompanying drawings.

This invention relates to certain improvements in power transmission devices, and it is an object of the invention to provide a novel and improved device of this general character which is adapted to be driven by the driving wheels of a motor driven vehicle.

Another object of the invention is to provide a novel and improved device of this general character comprising a supporting structure having mounted thereon a driven shaft in communication with a driving shaft, together with means adapted to place the driving wheels of a motor driven vehicle into operative engagement with the drive shaft carried by the supporting structure.

An additional object of the invention is to provide a novel and improved device wherein a balance wheel is employed in connection with the driving shaft and driven shaft carried by the supporting structure to facilitate the operation thereof and to substantially eliminate the possibility of injury to the motor and clutch mechanism embodied in the structure of the motor driven vehicle.

The invention consists in the details of construction and in the combination and arrangement of the several parts of my improved power transmission device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a portion in section illustrating the power transmission device constructed in accordance with an embodiment of my invention, the driving wheels of the motor driven vehicle in operative position relative thereto;

Fig. 2 is a view in top plan of the structure as illustrated in Fig. 1 with the driving wheels of the motor driven vehicle diagrammatically indicated; and Fig. 3 is a fragmentary sectional view, illustrating a slightly modified feature included in the invention as herein set forth.

As disclosed in the accompanying drawings, S denotes a supporting structure comprising a pair of spaced sills 1, substantially in parallelism and connected at spaced points longitudinally thereof by the transversely disposed braces or beams 2. Coacting with the opposite end portions of the braces or beams 2 and the sills 1 are the supplemental brace members 3.

Extending upwardly from one end portion of the supporting structure is the frame F provided at its top with a work table 4. Rotatably supported by the frame F in proper position with respect to the table 4 is a driven shaft 5, having fixed thereto a circular saw 6, whereby my improved device is particularly adapted for use in connection with wood work.

The sills 1, at a predetermined point inwardly of the opposite ends thereof rotatably support a transversely disposed drive shaft 7 provided adjacent its opposite ends with the drums or pulleys 8, each of which being adapted to be engaged by a driving wheel W of a motor driven vehicle. One end portion of the shaft 7 is provided with an additional pulley or drum 9 around which passes an endless belt 10 also disposed around a pulley or drum 11 fixed to an end portion of the driven shaft 5.

Inwardly of the drive shaft 7 and in close proximity thereto is a transversely disposed counter shaft 12. Rotatably supported by the sills 1 and fixed to said shaft at a point substantially midway between the sills 1 is a balance wheel 14, preferably about 160 pounds in weight. An end portion of the shaft 12 has affixed thereto a pulley or drum 15 which is engaged from above by the lower stretch of the belt 10 so that when the device is in operation, the balance wheel 14 operates to materially facilitate the operation of the driven shaft 5 and particularly when the saw 6 is engaged with the work and also to substantially eliminate the possibility of injury to the motor and clutch mechanism comprised in the motor driven vehicle.

The end portions of the sills 1 remote from the frame F are provided with the vertically swinging rock levers 16 pivotally engaged substantially midway their length with the sills 1 adjacent the upper margins thereof. The upper end portion of each of the levers 16 is provided with a fork 17 adapted to engage from below the rear axle or casing of the motor driven vehicle. The lower end portion of each of the levers 16 has pivotally engaged therewith an end portion of a rod 18. The opposite end portion of the rod 18 is pivotally engaged with a depending rock arm 19 carried by a transversely disposed shaft 20, rotatably supported by the sills 1.

The central portion of the shaft 20 has secured thereto at a point substantially midway of the sills 1 an upstanding lever or handle 21. By imposing pull upon the lever or handle 21 in a direction toward the frame F, the levers 16 will be caused to swing upwardly and inwardly and thereby raise the rear portion of the motor driven vehicle and bring each of the wheels W of said vehicle into proper engagement with a drum or pulley 8 whereby the motor of the vehicle may be readily employed as the source of power for the device. It is also to be particularly noted that when the driving wheels W of the vehicle are in contact with the drums or pulleys 8, the levers 16 have passed a dead center so that the weight of the rear portion of the vehicle is imposed upon the drums or pulleys 8.

When the motor driven vehicle is of a type wherein a truss rod is employed in connection with the rear axle or casing, I find it of advantage to provide a member 22 adapted to be suitably positioned upon the rear axle or casing for coaction with a lever 16. This member is substantially semi-cylindrical in cross section with its flat face provided with the longitudinally disposed groove or channel 23 to receive the under portion of the rear axle or casing and in its curved face with the longitudinally disposed groove or channel 24. The member 22 is held to the rear axle or casing in any desired manner but preferably through the medium of the straps 25, or the like.

From the foregoing description, it is thought to be obvious that a power transmission device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A device of the class described comprising a supporting structure, a drive shaft carried thereby, a driven shaft operatively engaged with the drive shaft, a counter shaft carried by the supporting structure and in driving connection with the operative connection between the drive shaft and the driven shaft, a balance wheel carried by the counter shaft, and means carried by the drive shaft for engagement with the driving wheel of a motor driven vehicle.

2. A device of the class described comprising a supporting structure, a drive shaft carried thereby, a driven shaft operatively engaged with the drive shaft, a counter shaft carried by the supporting structure and in driving connection with the operative connection between the drive shaft and the driven shaft, a balance wheel carried by the counter shaft, means carried by the drive shaft for engagement with the driving wheel of a motor driven vehicle, and means carried by the supporting structure to move the drive wheels of the motor driven vehicle into operative engagement with the drive shaft carried by the structure.

In testimony whereof I hereunto affix my signature.

RUDOLF PRANTNER.